Jan. 7, 1969    A. MAGIN    3,419,926
COLLAPSIBLE CABIN BOAT
Filed March 14, 1966    Sheet 1 of 11
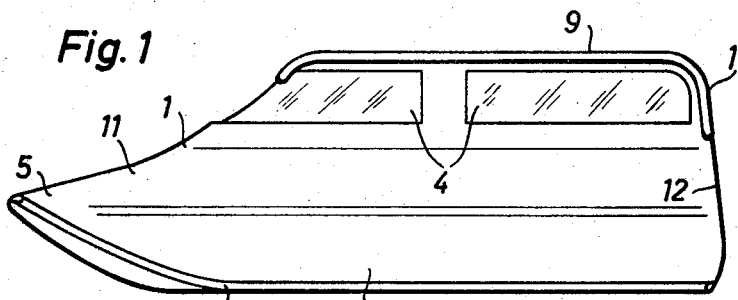
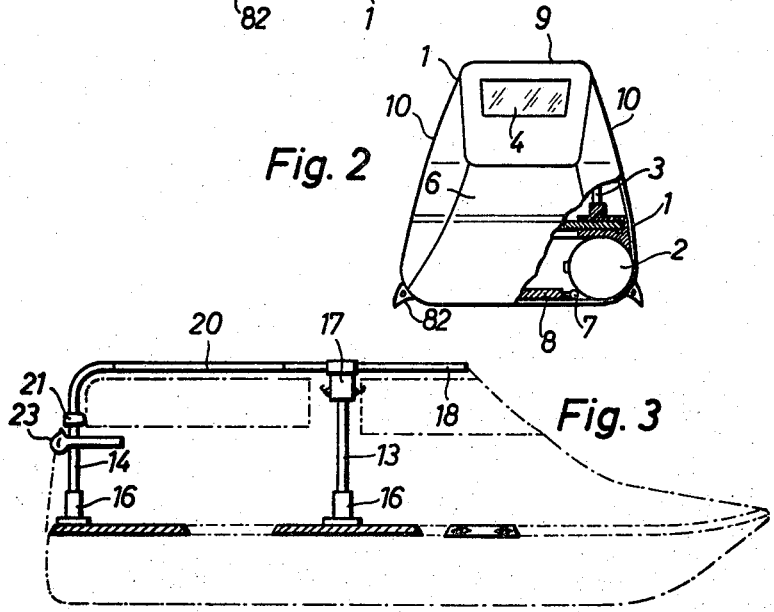
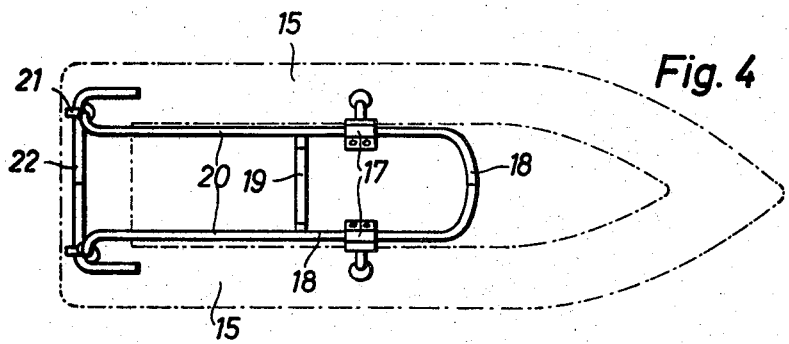
INVENTOR
Adam Magin
BY
Michael J. Striker

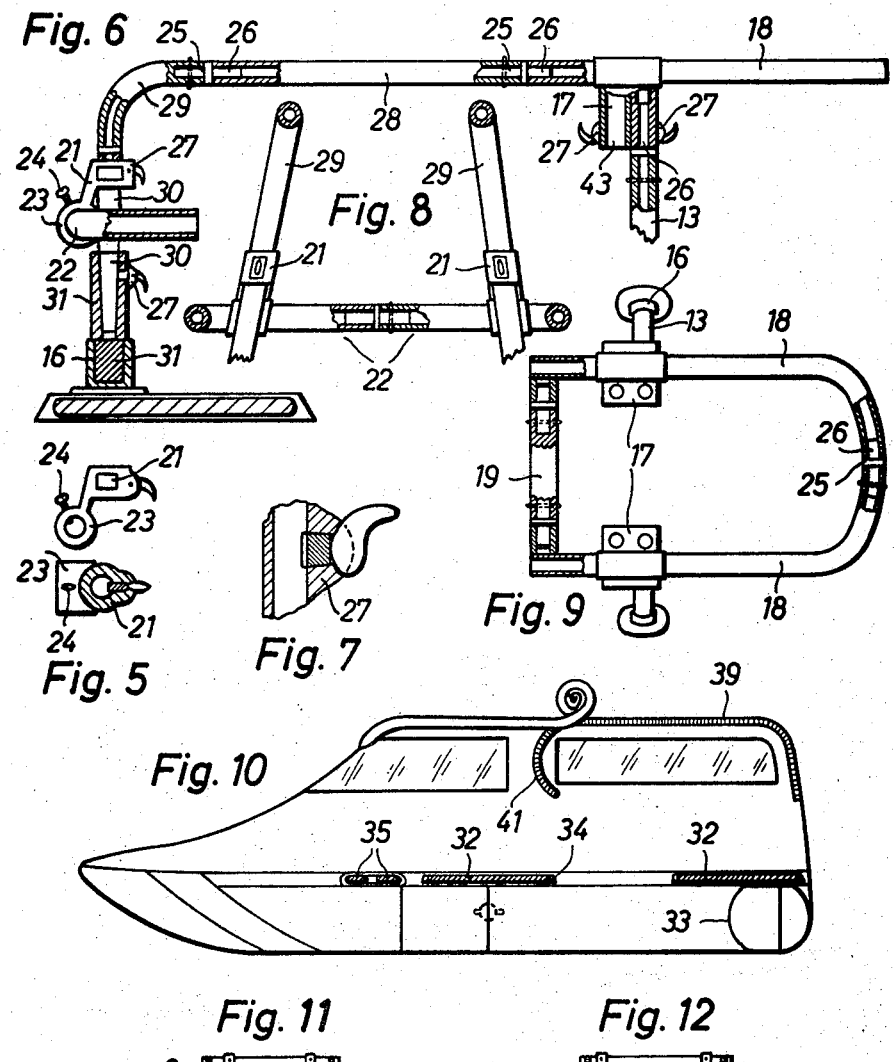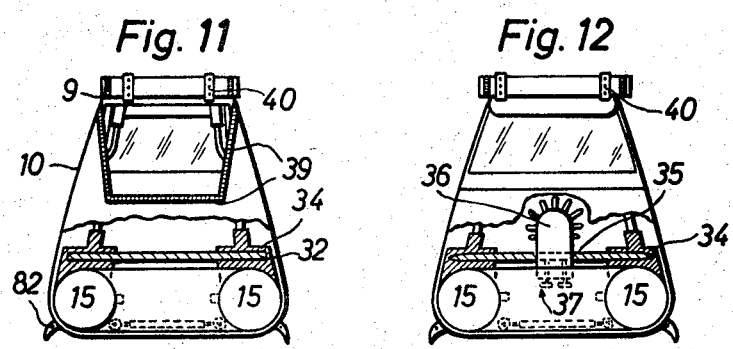

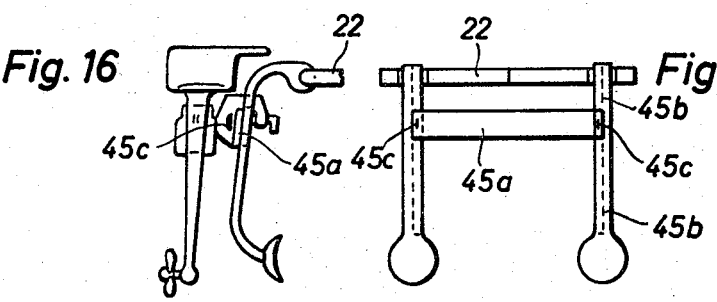
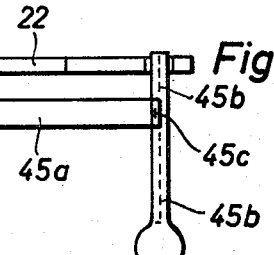
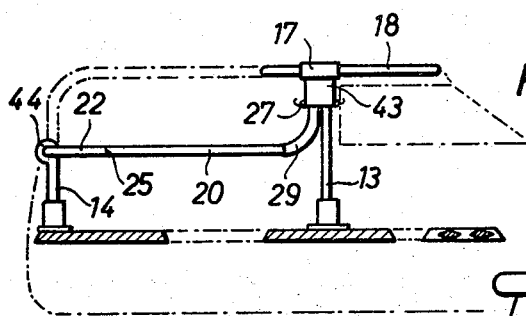
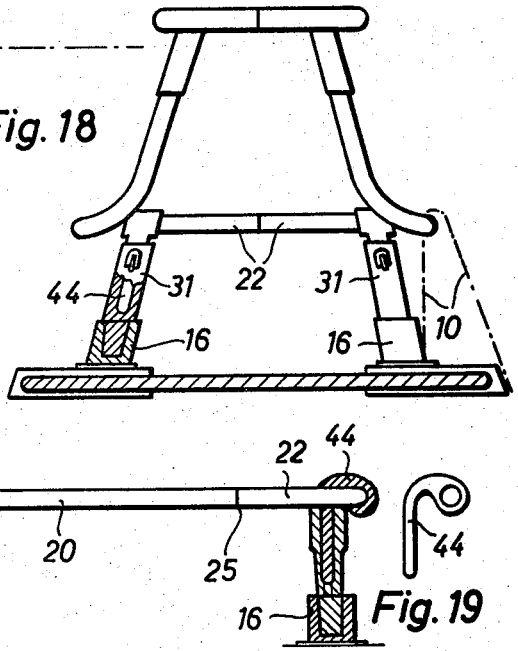
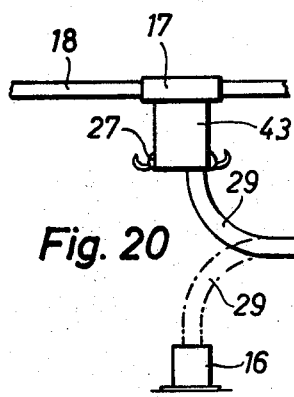
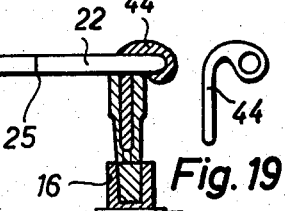

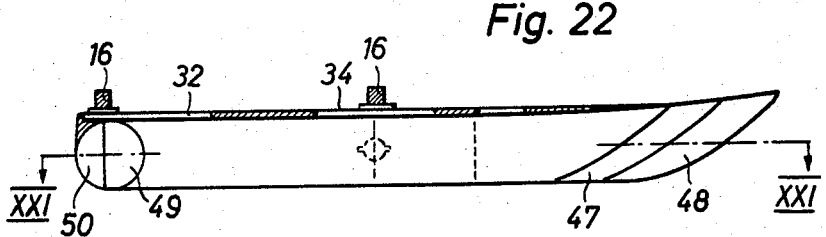
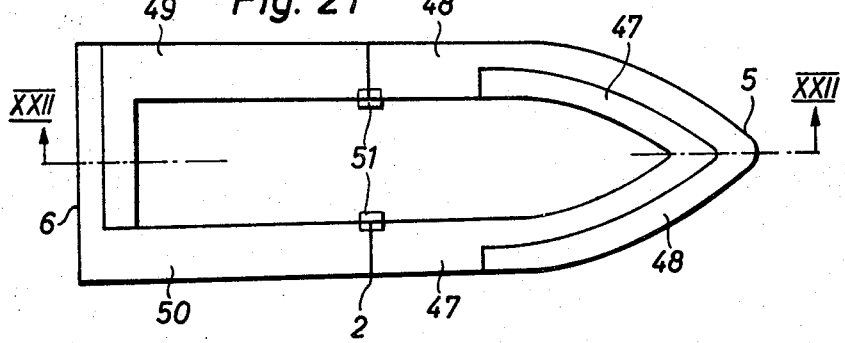
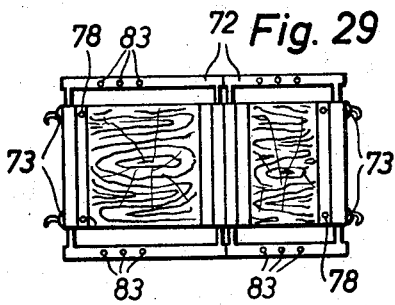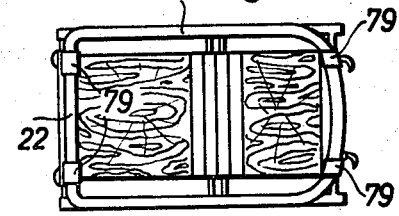
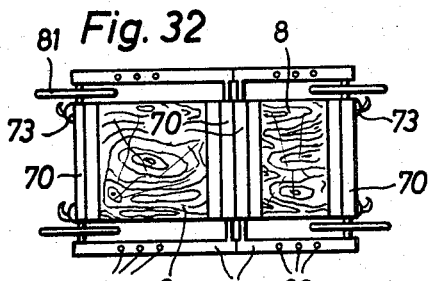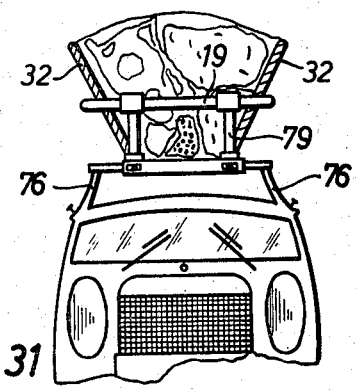

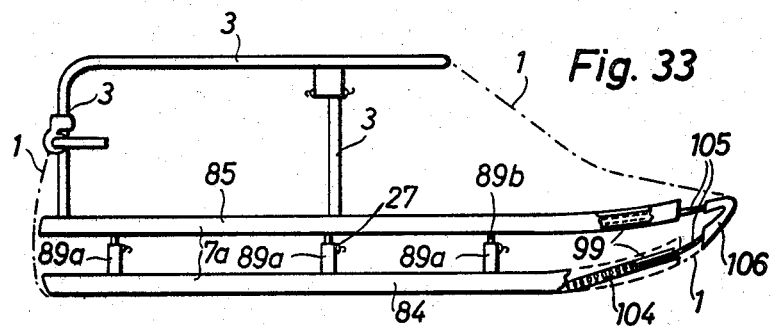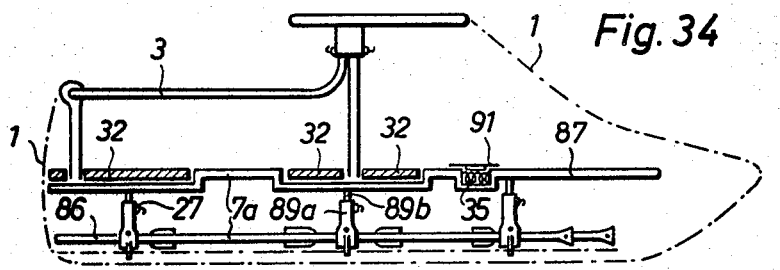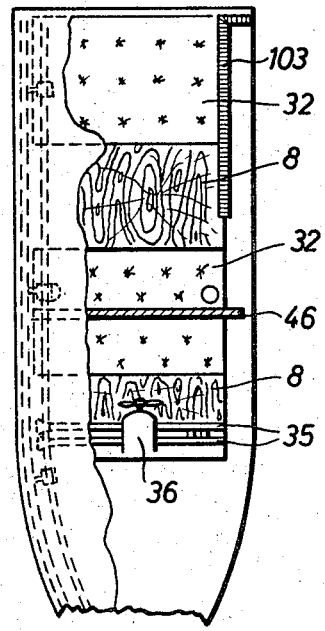

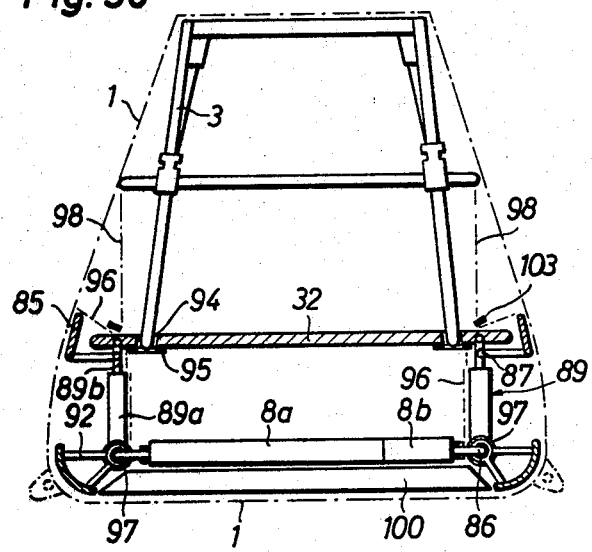
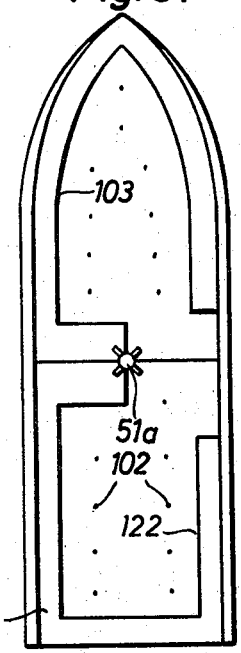
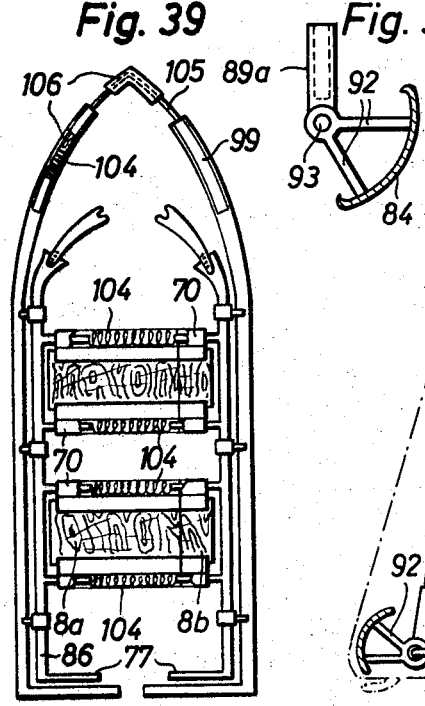
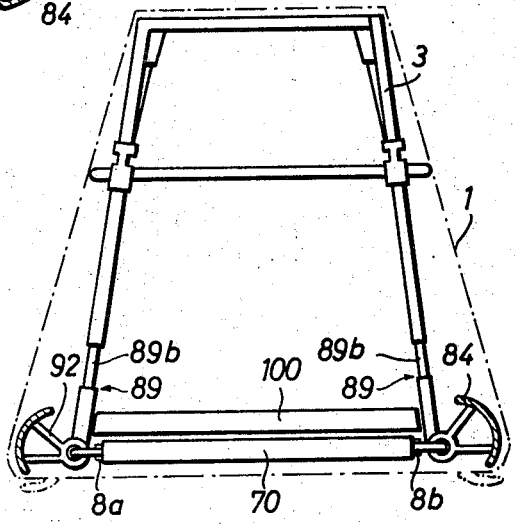

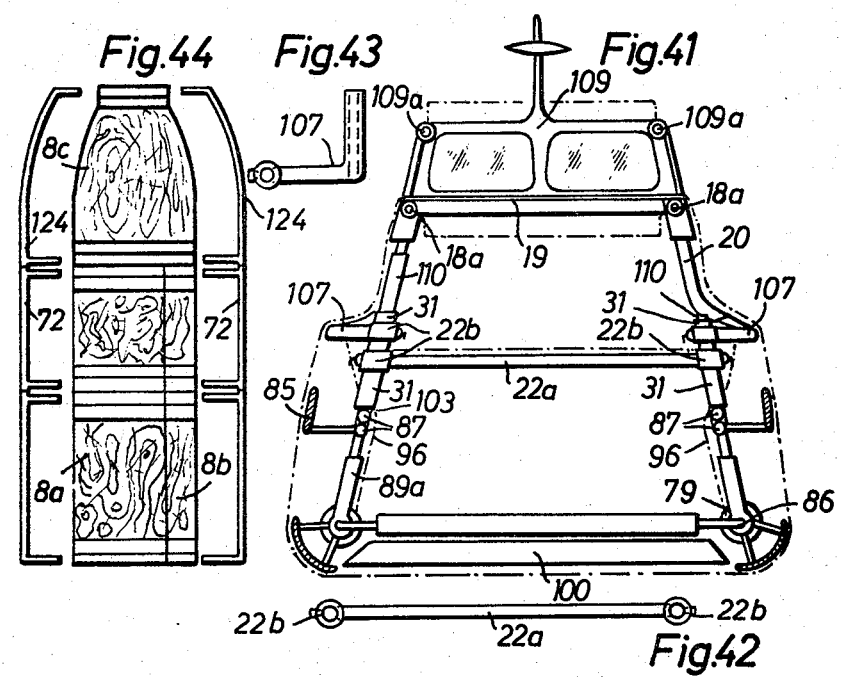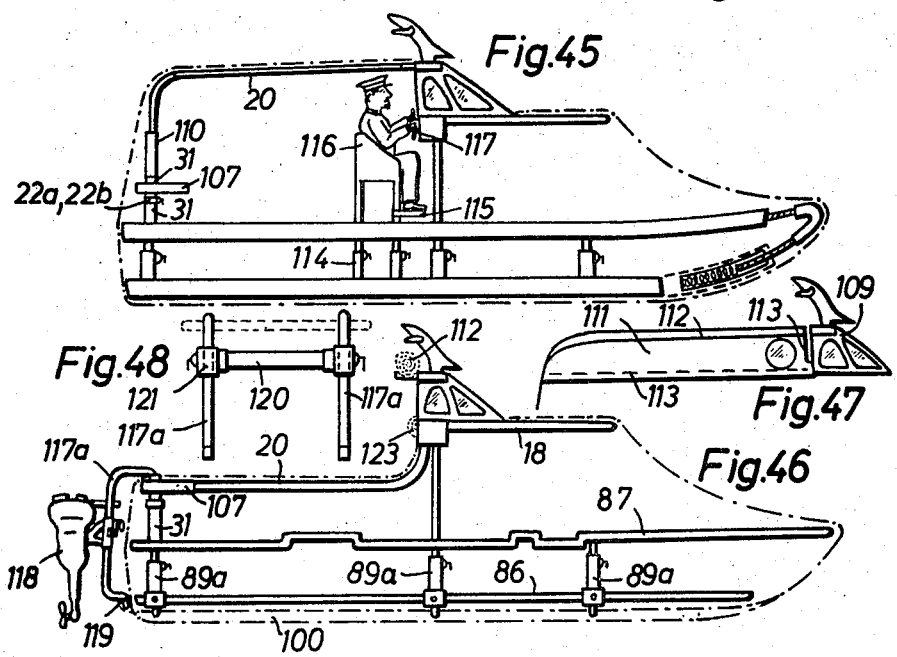

United States Patent Office 3,419,926
Patented Jan. 7, 1969

3,419,926
COLLAPSIBLE CABIN BOAT
Adam Magin, Weststrasse 1, Bochum-Langendreer,
Germany
Filed Mar. 14, 1966, Ser. No. 534,078
Claims priority, application Germany, Mar. 13, 1965,
M 64,528; Apr. 23, 1965, M 64,978; Sept. 17, 1965,
M 66,671
U.S. Cl. 9—2                              8 Claims
Int. Cl. B63b 7/08

ABSTRACT OF THE DISCLOSURE

A collapsible boat having a body, floor planks, an upper deck, side walls, and a cabin roof. An outer skin consists of at least one piece of watertight material and forms the body, upper deck, side walls and cabin roof of the boat. A separable multi-part bracing structure including coupling and connecting members is provided. Also provided is a separable multi-part supporting structure with coupling and connecting members, being arranged within the outer skin is the lower and upper portions of the boat, respectively, for bracing and stretching the outer skin.

---

It is the object of the present invention to provide a cabin boat for several persons, which, on the one hand, is very versatile and, on the other hand, can be manufactured at an extraordinarily low price as compared with its size and versatility. Such boat, moreover, should be easily transportable and of moderate bulk so as not to require much storing space.

This object is attained according to the present invention by providing a collapsible cabin boat with a hull mode of elastic material and consisting of a plurality of inflatable air chambers and with a cabin covering the hull on top thereof as well as bracing and supporting elements for stiffening the boat, which is characterized in that the inflatable hull is enclosed on all sides by a one-part watertight outer skin forming the body of the boat, the upper deck, side walls and the cabin roof and held in position in stretched condition in its lower part by the hull braced by means of a multiple-part bracing structure and floor planks and in its upper part by a multiple-part supporting structure supported on the hull.

A cabin boat of this design can be assembled in next to no time and readied for starting. It can easily accommodate several passengers but, on the other hand, may as well be used even by a single person. Due to the inflatable hull, it does not require much expenditure of energy to get the boat ready because the necessary tension is obtained by appropriately inflating the air chambers. The impermeable one-piece outer skin enclosing the entire boat protects the passengers from rain, wind, breaking waves and spray while almost unobstructed sight is ensured by large windows disposed on all sides. The one-piece outer skin is of particular advantage to the stability of the cabin boat, since it constitutes a resilient, it is true, but to a large degree loadable envelope which encloses the boat on all sides and against which the inflatable hull is tightly braced. In this arrangement the outer skin forms—with regard to statics—a very sturdy frame with regard to both the cross section and longitudinal section of the boat and is tightly stretched in its lower part by the hull braced by a bracing structure and floor planks and in its upper part by a multipart supporting structure. In this manner particularly great strength is achieved which is accompanied by a high degree of resiliency so that the cabin boat provided by the invention is even suitable for coasting at sea.

As compared with a rigid cabin boat made of wood or another material, the boat suggested by the invention has still numerous other advantages which are of great importance. For example, the boat according to the invention is not bound to one and the same water but can be collapsed and easily transported across the country to any sufficiently large lake, river or canal. Furthermore, no expensive berth in a boat house is required but even a storeroom far away from any shore will do in which, moreover, the collapsed boat will occupy only a small floor space.

Disassembling the boat can be effected at very low expenditure of time, work and energy by merely opening the air valves and separating the structural parts, which with the air being evacuated and the resulting slackening of the outer skin is particularly easy. The multipart supporting and bracing structures can be taken to pieces of handy size which can be easily stored away and do not need much space. The resilient outer skin too can be quickly packed up by rolling it up. A further advantage of the resilient outer skin preferably made of rubber-coated fabric is to be seen in the fact that in the case of damage it can easily and practically without expenditure lastingly be repaired by gluing on a patch. Together with the hull it forms, moreover, a second likewise watertight and rugged bottom of the boat. Furthermore, the supporting structures in the interior of the boat provide a welcoming and secure hold for the passengers in rough water. The motor of the cabin boat, which is preferably driven by an outboard motor, can also in a simple way be firmly connected with the hull through the intermediary of the supporting structure.

According to a further feature of the invention the part of the outer skin forming the rear portion of the cabin roof and the rear and upper portions of the side walls can be rolled up or folded inwardly in such a manner that only the fore-part of the cabin is left intact. This is particularly agreeable in fine weather and smooth water, since in this manner a cabin boat is provided which has a large upwardly and sidewards open quarter deck which is excellently suited, for example, for sun basking and fishing. The thus converted cabin further provides a wide open comfortable entry which is very advantageous, particularly for elderly and invalid people, and often the only thing that renders boating possible at all. Loading large and bulky luggage is also easily feasible with the opened cabin, the quarter deck providing sufficient space for numerous and also bulky things. Neither when fishing nor when alighting for a swim and climbing in again can the passengers, who, besides, enjoy an unhindered view, be troubled by the side walls and the cabin roof. Also the fact that the fore-part of the cabin is left intact is of particular advantage. This part provides a welcome wind screen for the persons on the quarter deck and, moreover, protects the passengers and especially the helmsman from spray which is thus kept off and unable to enter the boat. Depending on the direction of motion and the altitude of the sun the remaining fore-part of the cabin may also be used as an awning which on hot days casts a quite agreeable shadow. Foodstuff, photographic equipment, clothes and other things to be protected from water will be stowed away in the fore-part of the cabin where they are protected to a large extent even with an open quarter deck.

The foldable side walls and the roof of the hind portion of the cabin which can be rolled up save these parts from having to be completely detached from the other parts of the boat, thereby considerably facilitating the conversion. Also, the detached components need not be stowed away separately and thus cannot get lost. Since the side walls, in this case, are folded inwardly the boat retains outwardly its smooth shape and does not offer additional working surfaces to water and wind.

In a preferred embodiment of the invention, even after opening the rear part of the cabin the outer skin both in its front part and in its rear part is rigidly braced with the hull by the supporting structure assembled in a different manner. Fluttering and flapping of the sides of the boat which are of elastic material is thereby completely prevented in the stern, which otherwise might cause damage to the outer skin in high wind and produce a disturbing noise. The greatest advantage of this measure is to be seen, however, in the fact that the stability of the cabin boat which depends to a high degree on the stress of the outer skin is fully maintained even with a partly disassembled cabin. Distortion of the entire boat about one of its axes is not possible so that course, stability and manageability are in no way affected. The formation of folds in the outer skin which would not only be detrimental to the outer aspect of the boat but, if such folds in the outer skin were positioned below the water line, would also affect the speed, is likewise precluded. Consequently, this measure in an advantageous manner operates simultaneously on the most important characteristics of the boat, viz, strength, keeping upon the course or manageability and speed. The side walls folded down inwardly and securely rigged with the aid of the supporting structure, moreover, form a bulwark of practical height which extends all around the quarter deck and reliably prevents any person or articles whatsoever from going overboard.

According to a further feature of the invention, which proves very practical when the boat is being converted, the components of the supporting structure and its coupling elements as well as the disconnecting points thereof are respectively so designed or disposed that the same supporting structure braces the outer skin with the hull with a different arrangement of its component parts and coupling memebrs both when the cabin is completely built up and collapsed in its rear part. This results in the advantage that for the two possible assemblages only one frame structure is required so that another one, which would require an additional part of the available inner space, need not be carried along. Stowing space as well as weight are thus saved to a considerable extent and the cost of production, which is already considerably below that of a rigid cabin boat of the same size, are further cut to a great deal.

To enable the conversion of the boat to be effected at all in this form, the outer skin is designed to be ripped open in the region of its rear section, particularly along the transition between the cabin roof and the side walls. For reliably sealing the cabin at these points, the outer skin is provided at its separating points between cabin roof and side walls with outwardly covered water-tight closures, for which purpose mostly zip fasteners are used. These prevent in bad weather water from entering the interior of the boat when the cabin is closed. Rugged zip fasteners are further capable of transmitting a relatively high tensional stress without losing their advantageous characteristics in consequence of such loading. Such advantageous characteristics include above all the trifling expenditure of time and the simple manipulation for opening and closing such fasteners which thus also considerably accelerate and simplify the conversion of the boat. In this arrangement, in the first place zip fasteners are used the halves of which can be completely separated from each other and the ends as well as the slide of which can be unhooked. Instead of such zip fasteners also fasteners of any other type may be used which are of comparable strength and, moreover, to a large extent watertight.

For tightly bracing the side walls and thus the outer skin it is expedient that with the cabin partly collapsed and the side walls folded inwardly the top edges of the side walls to be secured to the cabin roof are secured to the top sides of the air chambers of the hull. Such fastening can be brought about in a simple manner by using an additional half of a completely separable zip fastener, which is arranged on the top of the air chambers of the hull and with which the half of the zip fastener disposed along the upper edge of the side wall and used with closed cabin as connecting element between cabin roof and side wall, is connected. For this purpose, consequently, only one fastener half need be additionally arranged on the hull, which is, anyhow, engaged by already existent fastener parts. The side walls folded down inwardly over the supporting rail and fixed by their upper edges to the hull suitably form a bulwark which is outwardly and inwardly covered in a watertight manner and thus protects the legs and feet of the passengers from spray.

In a particularly expedient embodiment of the invention, the security of the cabin boat with regard to its buoyancy and strength is ensured in that the hull is formed by preferably four separate air chambers overlapping one another particularly at the bow and the stern over the major part of their length. These air chambers, which do not communicate with one another, keep the cabin boat floating in a practically unchanged manner, even if air should escape due to any damage whatsoever of the hull or of a valve. By dividing the inflatable hull into preferably four air chambers an escape of the whole air is to a large extent precluded. When one of the air chambers is damaged, the boat retains its full buoyancy and substantially also its shape and strength, which is achieved by the considerable overlapping of the individual air chambers. In such an event it does not matter which one of the air chambers has become leaky, since one of the adjacent air chambers takes over the function of the damaged one. It is even possible to keep the boat afloat and manageable with only two of the four air chambers, not losing the necessary degree of stability, either. In such a case, the damaged air chambers are still connected with the two intact air chambers by the supporting and bracing structure in such a tight manner that these two chambers are capable of keeping afloat also the damaged part of the boat. It is, however, also possible to provide instead of four air chambers a larger number thereof and to dispose the partitions in another place. It is further possible but not necessary to make inflatable also the bottom of the hull, a subdivision into several air chambers being imaginable also in this case.

According to a particularly advantageous feature of the invention, each point of support of the supporting structure on the hull is carried simultaneously by at least two air chambers. This effect is first of all achievable by the fact that the points of support are preferably arranged exactly above the partitions between the individual air chambers and thus two adjacent air chambers each carry one half of a point of support. This ensures that a point of support of the supporting structure completely fails only when several air chambers have become untight which, however, scarcely happens in practice. But should this really happen so that a point of support fails completely, the stability of the cabin as well as the strength of the entire boat would still be largely ensured since in case two air chambers should fail one point of support would fail at the most and the remaining three points of support would by all means be in a position to further maintain the stability of the entire boat.

The short building-up time of the cabin boat and the easy handling of the boat is, moreover, favored by the fact that each time preferably two air chambers are inflatable or deflatable through a single air chamber valve without the individual air chambers communicating with one another in a compresed air conducting manner in the closed condition of the valve. In the case of e.g. four air chambers thus a total of only two valves is necessary, each of which ensures in an advantageous manner a completely uniform filling of air into two air chambers of the boat body, which is of particular importance for a regular and symmetrical configuration of the boat. This makes a repeated change of the individual air chamber valves during the blowing-up operation and the repeated connection and detachment of the connecting tube e.g. of a bellows, which is connected with the blowing-up operation, unnecessary without the safety of the boat being, however, impaired by the division of the hull into several air chambers since the air chambers do not communicate with one another in the closed condition of the valve. Further advantages result from the particular construction of the air chamber valve which has a twofold seal in the form of an automatically acting spring-loaded inner sealing member and a removable outer sealing cone braceable by means of a toggle closure. Thus the two air chambers are double sealed from outside so that the safety of the boat is considerably increased since in case one seal should fail the second seal is by all means in a position to maintain the pressure in the air chambers of the hull. But not only the safety of the boat is increased by such a construction of the valve but also numerous disadvantages are eliminated which are inherent in the previously known air chamber valves for pneumatic boats. With the valve as proposed by the present invention air can no longer escape from the air chambers after completion of the blowing-up operation when the connecting tube of the bellows or the compressed-air cylinders is separated from the air chamber valve, which is generally the case with the known valves. In the air chamber valve as proposed by the invention the spring-loaded inner sealing member immediately engages its sealing surface as soon as the connecting tube is withdrawn from the valve body, whereby an escape of part of the just fed air is impossible. The removable outer sealing cone can then be braced without haste on its valve seat as an additional second seal and this is easily feasible with the aid of a toggle closure which can be rapidly operated without great expenditure of energy. Further advantages result from the particularly sturdy construction of the outer sealing cone and its sealing surfaces which are preferably made of soft rubber and reliably and completely tightly seal the air chambers from outside even in the case of grains of sand adhering to the sealing surfaces which can hardly be avoided when building up the boat on a shore. Furthermore, the outer sealing cone protects the interior of the valve against penetrating dirt and also makes an unintentional deflation of the air chambers by pressure on the spring-loaded inner valve body impossible. Finally, such a construction of the air chamber valves results in a reduction of the costs since for two air chambers each time only one single valve is required and thus half the valves are saved as compared with the known constructions. However, it is also possible to provide in special cases also each individual air chamber with one air chamber valve of the above-described special construction.

In an expedient embodiment of the invention the hull is additionally stiffened by auxiliary paddles arranged transversely to the direction of motion of the boat and preferably padded seats. The cabin boat is thus imparted an additional reinforcement by parts which are carried along or incorporated in such a boat anyway and which in this case effectively stiffen the hull apart from their normal function. Such an arrangement of the auxiliary paddles and seats is particularly advantageous when one or even two air chambers have become untight, The slack air chamber is then prevented from collapsing in spite of the escaped air and its load is transmitted through the auxiliary paddles and the seats to another still filled air chamber. Also the loading of the air chambers by the contact pressure of the supporting structure is distributed over a large surface and over at least two air chambers since the supporting structure is preferably supported on the hull or the air chambers through the end sections of the seats. Thus with the air chambers filled a large local strain of the material is avoided. In the case of damage to one or even two adjacent air chambers the supporting action of the seats is particularly advantageous because the point of support of the supporting structure is also then still carried by the seat secured at its other end section. This again increases the safety of the boat in an advantageous manner to a considerable extent. An all-round padding of the seats, above all of the edges of the seats, on the one hand protects the passengers from injuries in the event of a rough sea and a heavily rolling boat and on the other hand imparts the seats a comfort agreeable to the passengers especially during longer journeys. It is by all means possible to provide instead of the seats continuous bars or frames which are arranged transversely to the direction of motion of the boat and on which pads are mounted which are largely adapted to the form of the human body.

To permit the auxiliary paddles and the seats to reinforce the hull in an effective manner and to sufficiently support in case of need an air chamber that has become untight, both the auxiliary paddles and the seats are, according to a further feature of the invention, tightly clamped in lateral pockets situated on the top sides of the air chambers and provided with a fastener, preferably a zip fastener. Owing to the easily openable fastener the auxiliary paddles and the seats can be easily removed when deflating the air chambers, whereas on the other hand with the pockets in closed condition they are particularly firmly and reliably connected to the hull. Not only when deflating the air chambers of the cabin boat but also when loading pieces of luggage or on other occasions where a particularly large free space is required on the quarter deck there is the possibility of quickly removing without effort one or more seats. Furthermore, such a firm but rapidly detachable mounting is particularly advantageous for the auxiliary paddles since in the event of failure of the motor it is ofen very important for the passengers to have the auxiliary paddles at hand in a short time thereby to prevent a more serious damage.

As a further development of the cabin boat, a steering device known per se is easily detachably secured by means of a quick-action locking device to the auxiliary paddles tightly clamped in the front half of the boat. Such a measure saves an additional holding device on the hull for such a steering device and this means apart from a saving of weight a further reduction of the manufacturing costs. Moreover, no additional space is required therefor. A further advantage is to be seen in that with the cabin opened the steering device can be readily removed because then the outboard motor acting as a rudder can be operated and controlled from the rear seat also without such a device, which is, however, not absolutely necessary since the steering device may also be used with the cabin in its opened condition if this may appear expedient for whatever reasons.

A further feature of the invention consists in that the components and coupling elements of the supporting and bracing structures are so designed that a roof mounted luggage carrier for the packed-up boat, which is adjustable to fit any motor vehicle, is producible from a number of component parts of the bracing and supporting structures. The transport of the boat across the country is considerably facilitated by this measure and the purchase of a special transport vehicle or of a special luggage carrier for an already available vehicle can be saved. The bracing and supporting structures which must be carried along, anyway, thus not only do not require any transport space but provide even additional space for the collapsed boat. In this manner the luggage boot or loading space of the transport vehicle is kept free for other pieces of luggage not necessarily belonging to the boat. In order to enable the boat to be watered also in such places where the transport vehicle cannot get at the shore, the roof mounted luggage carrier can be converted, according to another feature of the invention, into a boat's cart by attaching wheels thereto. It has further proved expedient to design and shape the floor planks and seats of the hull so that they can be used as bottom or side walls of the roof mounted luggage carrier or of the boat's cart, respectively. It is thus avoided that when the boat is being transported small parts fall off the roof mounted luggage carrier or out of the boat's cart and are lost. Further it is attained that the folded up outer skin as well as the evacuated hull are received by a sufficiently large supporting surface on the roof mounted luggage carrier or on the boat's cart, respectively, so that damage caused by transport is largely avoided.

In a further embodiment, the hull and the outer skin are made in one piece. This results in a saving of material and, moreover, in reducing the manufacturing cost and the weight of the boat.

This invention also relates to a development of the cabin boat, which is characterized in that while omitting the inflatable hull, in addition to the cabin roof and the side walls also the lower part of the outer skin is held in stretched condition in its predetermined form and position merely by a bracing structure capable of being disassembled into handy components. The elimination of the inflatable hull involves above all the suppression of the inflatable beads of the boat and thus results in a considerable enlargement of the boat's interior, since the bracing structure replacing the hull requires much less space than the hull with its large inflatable beads. In a cabin boat constructed in this manner it is thus possible to provide a considerably enlarged interior space so that an increased number of passengers can be conveyed. But when the number of passengers is small the enlarged interior space gives the passengers more room to move and provides a considerably enlarged stowing space so that bulky pieces of luggage of still larger dimensions can be stowed away without difficulty. The suppression of the inflatable hull further means that for getting the boat ready for sea no means for inflating the boat's body, such as a compressed-air bottle, is required. The boat has a great stability in spite of the elimination of the hull or body. The bracing structure which has been supplemented by essential parts forms a very strong and rigid frame which is even up to considerable loads and stresses, keeping the outer skin tightly stretched as required. The strength thus achieved with concomitant elasticity is of such an order that the cabin boat can even be used for coasting at sea. Also, the bracing structure dismountable into handy components can be packed to easily transportable bundles corresponding in weight to the passengers' carrying capacity, after the boat has been disassembled. A further advantage of this cabin boat consists in that the outer skin has large surface areas which, although tightly stretched from within by the bracing structure, are not in direct contact with parts of the bracing structure. In the region of these surface areas not directly contacting the bracing structure the tightly stretched outer skin, consequently, is capable of giving way inwardly to a slight degree when coming in contact with sharp obstacles, such as pointed stones, thereby to considerably reduce the risk of damaging the outer skin. The suppression of the inflatable hull also makes it easy to detect possible leaks and to get at them from within so that they can be quickly and easily eliminated.

It is particularly expedient if the bracing structure consists of a plurality of frames distributed over the length of the boat and arranged transversely to the direction of motion of the boat, which frames are rigidly interconnected by continuous longitudinal braces extending in the direction of motion of the boat. In such an embodiment, the upper cross members of the frames are formed by preferably padded seats which rest with their end sections on the longitudinal braces arranged on both sides. On the other hand, the lower cross members of the frames are formed by floor planks which also serve as step surface. The incorporation of the seats as well as the floor planks in the supporting structure for the bracing structure results in an extremely advantageous saving of special cross members the functions of which are taken charge of by component parts of the boat that are required in any case. This leads to a simpler and more clearly arranged construction of the bracing structure with a reduced number of component parts, whereby the assembly and disassembly of the cabin boat are considerabily facilitated. On the other hand, this results in an important saving of weight and work during the manufacture of the boat, which in turn results in a corresponding reduction of the manufacturing cost.

According to a further feature of the invention the frames have substantially upright supporting elements which are smoothly extensible and retractable in length to a limited extent and arrestable at any extended length. The supporting elements constructed in such a manner carry not only the seats and the upper longitudinal braces of the cabin boat but, since also the supporting structure is supported on the end sections of the seats, also the upper part of the outer skin forming the cabin roof and the side walls. The adjustable extended length of the supporting elements imparts the passengers at any time the possibility of retightening the outer skin of the cabin boat and also of reducing the tension if necessary so to do, which may be required in the case of largely varying temperatures. Moreover, a contraction of the outer skin as a result of a relatively long time of storing in packed-up condition does not lead to the disadvantage that subsequently placing the bracing structure in the outer skin meets with difficulties or is no longer possible. Rather, owing to the extensible construction of the supporting elements, the bracing structure is adjustable to such an extent that it can be adapted without difficulties to the changed conditions. Another advantage of this construction of the supporting elements is to be seen in that regarding the dimensions of the outer skin no close manufacturing tolerances need be observed because even large deviations can be compensated by adjusting the supporting elements. Furthermore, with a corresponding adjustment of the clamping connections of the supporting structure a considerable vertical adjustment of the seats is possible whereby a comfortable sitting of the passengers is always ensured.

In a preferred embodiment of the invention the longitudinal braces have at the points of support of the seats each time one offset portion dimensioned and shaped so as to correspond to the width and thickness of the respective seat. This clearly determines the position of the seats in the longitudinal direction of the boat. Furthermore, also shearing stresses acting in the longitudinal direction can be taken up by them. As a further result, an advantageous even surface of the longitudinal braces and seats is obtained while avoiding angular stepped portions which with the boat built up may lead to damage to the outer skin. Also the auxiliary paddles, which are likewise able to take up part of the load of the bracing structure, are inserted in such an offset portion corresponding to the dimensions of the auxiliary paddles, which is of particular advantage is view of the additional load exerted by the steering device.

As a further development of the cabin boat, the bracing structure is braced with the outer skin merely through preferably four bracing strips extending continuously in the direction of motion of the boat from the bow to the stern. Such a measure ensures that apart from the already mentioned flexibility of the outer skin, which is of particular advantage when the outer skin comes into contact with sharp-edged obstacles, the largest part of the inner surface of the outer skin remains accessible. This extremely facilitates repair and maintenance work and renders possible e.g. to improve the paint of the bracing structure or to rub the inner surface of the outer skin with a servicing compound even when the boat is built up. But above all those points of the outer skin that are particularly exposed to danger are quickly accessible from the interior and can thus be easily sealed in case leakage should occur.

A further feature of the invention consists in the fact, that one of the bracing strips provided at each side of the boat is arranged below the water level at the transition edge between the floor of the boat and the side wall and a second bracing strip is arranged on the side wall at the level of the seats. These places which are to be preferred for the arrangement of the bracing strips are frequently exposed to heavy impact stresses when laying the boat alongside of a landing-place, in which case it is very advantageous when these impacts are not absorbed by the outer skin but directly by the substantially more stable bracing structure. Moreover, these places are particularly important for the configuration of the cabin boat because the outer skin is compelled by the bracing strips to assume an exactly predetermined form in these places. Furthermore, in order to give the outer skin the intended form of the boat, the bracing surfaces of the bracing strips facing the outer skin expediently have a curvature corresponding to the outer shape of the boat. Thereby it is achieved that the outer skin engages the bracing strips over their entire bracing surfaces and the outer skin is prevented from getting chafed at the boundary edges of the bracing strips. The longitudinal edges of the bracing strips can be designed so as to meet this requirement, it being, moreover, recommendable to manufacture the bracing strips from synthetic plastics material.

The bracing strips are each connected preferably in the region of the frames by means of at least one brace to the remaining parts of the bracing structure, and, furthermore, these braces of the bracing strips may be constructed, together with one half of the supporting elements of the frames, as a one-part supporting element. In this manner the number of the component parts of the bracing structure is considerably reduced. Moreover, numerous points of connection of the bracing structure, which always require a great expenditure of work during the manufacture, are saved. Also, the relatively small braces are not so easily lost when making them in one piece with the larger half of the supporting element. With such a construction the cabin boat can be built up in a substantially simpler way.

In an advantageous embodiment of the invention the supporting elements can be pushed on to the longitudinal braces of the bracing structure and are preferably provided with means for fixing the supporting elements to the longitudinal braces. The component parts of the bracing structure are thus easily separable from one another but, on the other hand, in their assembled condition so firmly connected together as is required by the heavy load exerted by the outer skin.

A still further feature of the invention consist in the fact that an inflatable double-bottom serving as an air cushion may be arranged between the floor planks and the outer skin, which double-bottom may be subdivided into preferably four separate indented air chambers. Such a double-bottom has at least such a great carrying capacity that in case of need it is in a position to prevent the cabin boat from going fully down even in the event of a very heavy water breaking-in. The indented air chamber, moreover, impart the boat an additional safety in as much as they largely exclude the possibility of the entire air escaping from the double-bottom. Even in the event of damage to one or even two of the preferably four air chambers there still remains sufficient air in the remaining chambers to keep the boat floatable.

Preferably all air chambers are inflatable and deflatable through one single air chamber valve. However, the individual air chambers do not communicate with one another in a compressed air conducting manner in the closed position of the valve. Thereby the building-up time of the cabin boat is further shortened and the simple handling of the boat still more facilitated. A repeated change of the individual air chamber valves during the blowing-up operation of the double-bottom and the repeated connection and detachment of the connecting tube e.g. of the bellows, which are connected with the blowing-up operation, are thus completely unnecessary. However, on the other hand the safety of the boat against sinking, which is achieved by the division of the double-bottom into several air chambers, is not impaired since despite the use of one single air chamber valve the air chambers do not communicate with one another in the closed condition of the valve.

In an expedient embodiment of the cabin boat the inflatable double-bottom is detachably arranged between the planks of the boat and the outer skin so as to be removable even when the boat is built up.

Thus it is possible to take the double-bottom out of the boat without extensive disassembling work and to use it as a raft or even as an air mattress. Another possibility offers itself to the passengers of the cabin boat if passing the night ashore is not desired or not possible for any reason whatsoever. In such cases a spacious and comfortably usable surface to lie down on can be produced by means of the double-bottom pulled out from between the floor planks and the outer skin in that this double bottom is placed on the hard floor planks where it constitutes, at the same time, a welcome insulation against cold and moisture.

According to another feature of the invention, a span wall extending continuously from the bow to the stern is secured to the inner side of the outer skin on both sides of the boat directly above the bracing strips arranged at the level of the seats. The span walls preferably manufactured from the same material as the outer skin enclose both the supporting elements of the frames and the bracing strips and cover them toward the interior of the boat. Lateral stowing spaces are provided in this manner which are partitioned off towards the interior of the boat and serve for storing pieces of luggage, foodstuff, clothes or the like. The stowing rooms are accessible from the interior of the boat through separately lockable openings in the span walls, it being possible in this arrangement that the longitudinal edges of the span walls remote from the outer skin are secured to the lower longitudinal braces and/or the floor planks with the aid of press buttons, hooks and eyes or similar connecting elements. Such fastening means ensure, on the one hand, i.e. when the boat is being assembled or disassembled, rapid and effortless fastening or loosening, respectively, of the longitudinal edges of the span walls from the lower longitudinal braces and/or floor planks, whereas on the other hand, i.e. in the assembled boat, they connect the span walls with sufficient strength with the parts of the bracing structure. It is achieved in this manner that the span walls, in conjunction with the bracing structure, answer their purpose proper, viz. the tight stretching of the lower part of the outer skin. They further prevent in a reliable manner that the outer skin and the parts of the bracing structure are unsymmetrically incorporated and distorted relative to each other, which would considerably reduce the boat's capability of keeping upon the course, as well as its speed.

With a partly disassembled cabin and inwardly turned side walls it is expedient to fasten to the top of the span walls the upper edges of the side walls which in the closed cabin are secured to the cabin roof. Such fastening can be effected in a simple manner in that an additional half of a fully separable zip fastener of the outer skin is arranged at the transition between the cabin roof and the side walls on the top of the span walls and connected with the half of the zip fastener in each case provided on the upper edge of the side wall and which in the closed cabin is used as a connecting element between cabin roof and side wall. In addition to the tight stretching of the side walls with the aid of the supporting structure and the resulting strengthening of the boat in the case of an opened cabin, the side walls folded down inwardly and, in that case, having their upper edges fastened to the span walls form in an expedient manner a bulwark consisting of the rigid supporting structure which is braced against the outer skin and internally as well as externally covered by the side walls so that the passenger's legs and feet are protected from spray.

Because of the enlarged interior space of the cabin boat it is recommended that the floor planks, which are dimensioned according to the measures of the interior space, are brought to a width corresponding to the interior of the boat by applying thereto a detachably secured complementary part.

A particular advantage of the cabin boat proposed by the invention consists in that it can use all the essential parts of the cabin boat, particularly the same outer skin, as well as the same bracing and supporting structures as the cabin boat including the inflatable boat. The bracing structure is merely completed by some additional parts, whereby the inflatable hull is replaced.

It is known that an inflatable boat or raft has resilient properties. Such resilient properties positively transmit themselves to the whole cabin boat. But in order not to miss valuable properties in the last embodiment a generally known bracing system but in the development of collapsible canoes not yet known bracing possibility has been devised which promises particular properties for the future. For one of these particular properties is that the cabin boat in the case of a collision at the bow or even at its sides can score an enormous diminution of the impact, which is due to the resilient tension. Furthermore, locking fasteners can be altogether dispensed with owing to this invention. Such resilient feature should make themselves felt rather favorable when landing. The cabin boat being also intended for coasting at sea, these resilient properties in such waters will render the cabin boat still more resistant, e.g. in the case of breaking waves or when running on a sandbank.

Developing the invention it is possible to convert the cabin boat into a cabin cruiser for higher demands. The cabin cruiser, too, can be easily transported on a luggage carrier and, above all, manufactured at substantially lower cost than the known solid cabin cruisers, and so as to be resiliently braceable.

It should also be appreciated as an inventive feature that preferably light-metal tubes are used. The tubes of light metal can be telescoped or pushed onto one another. Therefrom the possibilities originated that helped the boat to be developed to such a far-reaching extent.

Since, as is known, the regulations concerning the overloading of vehicles are everywhere taken quite serious, and that with good reasons, and since, on the other hand, the adidtional loading capacity of any motor car is very limited, these light-metal tubes, in addition to the strength, are also of great advantage as light metal. To enable a more rapid assembling of the cabin cruiser it may be provided that the individual parts of the structure are numbered in such a manner that the associated parts are given the same number. Additionally, assembly instructions for the owner may be attached to the boat.

Embodiments of the invention will now be described by way of example and with reference to the accompanying drawings, in which:

FIG. 1 is a side view of a cabin boat according to the invention;

FIG. 2 is a view of the cabin boat as seen from the stern;

FIG. 3 is a side view of the cabin boat, illustrating the supporting structure;

FIG. 4 is a top plan view thereof;

FIGS. 5 to 9 show, on an enlarged scale, the component parts of the supporting structure in the closed condition of the cabin;

FIG. 10 is a longitudinal section through the cabin boat with the cabin roof opened;

FIG. 11 is a view, partly in section, of the cabin boat of FIG. 10 as seen from the stern;

FIG. 12 is a view, partly in section, of the cabin boat of FIG. 10 as seen from the bow;

FIG. 16 is a side view of the fixing arrangement for the motor;

FIG. 16a is a rear view of the fixing arrangement;

FIGS. 17 to 20 show details, on an enlarged scale, of the component parts of the supporting structure in the opened condition of the cabin;

FIG. 21 is a horizontal section through the hull taken on the line XXI—XXI of FIG. 22;

FIG. 22 is a longitudinal section through the hull taken on the line XXII—XXII of FIG. 21;

FIG. 29 is a view of the roof mounted luggage carrier as seen from below;

FIG. 30 is a top plan view of the roof mounted luggage carrier of FIG. 29;

FIG. 31 is a front elevational view of the luggage carrier of FIG. 29 as mounted on the roof of a transport vehicle;

FIG. 32 is a view of the boat's cart as seen from below;

FIG. 33 is a side view of the bracing and supporting structure in the closed condition of the cabin;

FIG. 34 is a side view of the bracing and supporting structures in the opened condition of the cabin;

FIG. 35 is a top plan view, partly in section, of the cabin boat with the cabin in closed condition;

FIG. 36 is a view of the supporting and bracing structures as seen from the stern;

FIG. 37 is a horizontal section through the double-bottom;

FIG. 38 is a side view of a supporting element;

FIG. 39 is a top plan view of the elastic bracing structure;

FIG. 40 is a cross section through the cabin boat as converted into a tent;

FIG. 41 is a cross section through the cabin boat as converted into a cabin cruiser;

FIG. 42 is a top plan view of the stern clamping structure;

FIG. 43 is a top plan view of an arm clamping device;

FIG. 44 is a top plan view of the bracing structure with complementary floor plank;

FIG. 45 is a side view of the supporting structure with the cabin of the cabin cruiser in closed condition;

FIG. 46 is a side view of the supporting structure with the cabin of the cabin cruiser in opened condition;

FIG. 47 is a side view of the quarter deck, the side walls and the windows;

FIG. 48 is a longitudinal view of the supporting structure;

Figure 13:
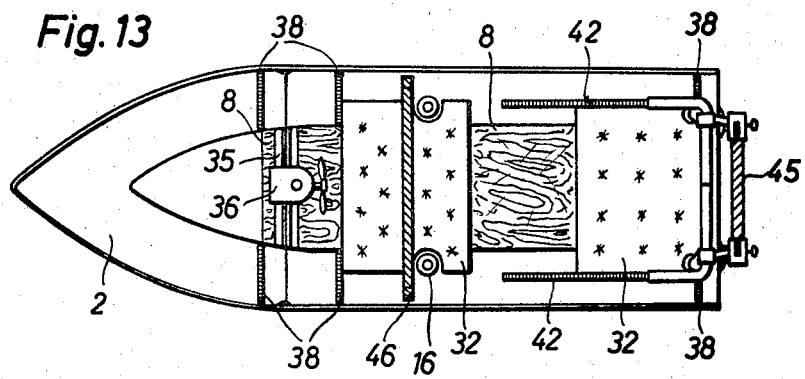
FIG. 13 is a top plan view of the cabin boat of FIG. 10.
Figure 14:
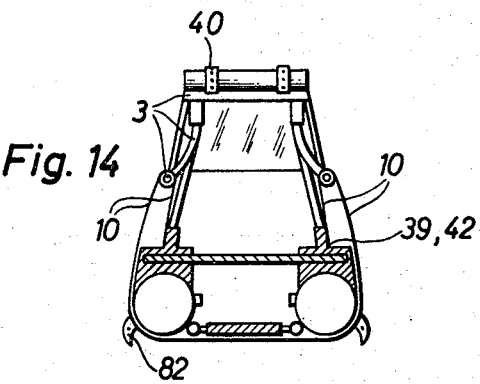
FIG. 14 is a cross section through the cabin boat taken on the line XIV—XIV of FIG. 15 in the opened condition of the cabin.
Figure 15:
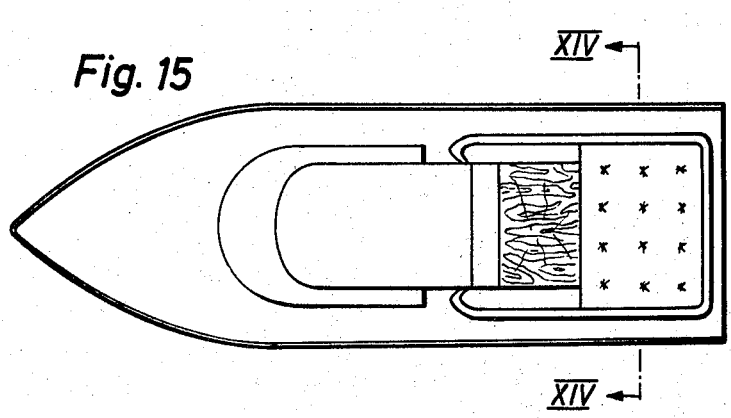
FIG. 15 is a top plan view of the cabin boat of FIG. 14.

FIGS. 1 and 2 show a cabin boat which comprises an outer skin 1 made in one piece and an inflatable hull 2 contained therein and braced by means of a supporting structure 3. The outer skin 1 is preferable made of an impermeable material of high strength and, at the same time, high resiliency. The outer skin 1 is provided on all four sides of the boat with large watertight windows 4 made of a clear vision transparent plastic foil of high strength and resiliency. The shape of the outer skin 1 greatly conforms to the hull 2 having a pointed bow 5 and a square stern 6. The hull 2 is reinforced by means of a bracing structure 7 and planks 8 which are clamped together and made either of wood, metal or plastic.

The supporting structure 3 of the cabin boat supports a cabin roof 9 formed by the outer skin 1, and stretches the outer skin 1 so that all parts of the outer skin 1 such as the side walls 10, the upper deck 11 and the stern wall 12, are taut. Also the lower part of the outer skin 1, which encloses the hull 2, is stretched.

To improve the travelling properties of the cabin boat, this is provided on each side with so-called fiddles 82, i.e. antirolling rims, arranged on the hull or the outer skin and extending below the water line in the direction of motion. These fiddles 82 (FIGS. 1, 2, 11 and 14) reduce rolling of the boat about its longitudinal exist to a high degree and moreover, improve its capability of keeping upon the course and its manageability. Such fiddles are, if made of a rigid material, disconnectable into handy lengths so that they can be easily hauled when the boat has been packed up. Fixing them to the hull or to the outer skin is effected in most cases by inserting them in preferably vulcanized on guide rails or loops, but, of course, numerous other possibilities may also be adopted. A further feature of the invention consists in that at least one of the fiddles preferably consisting of rubber is bored in longitudinal direction and serves as a guide for an anchor rope extending from the bow to the stern. The arrangement of additional guide rollers are guide rings on the outer skin of the boat is avoided by this meaure, which advantageously results in a better manageability and a reduced water resistance.

The manufacture of fiddles of rubber or another resilient material permits them to be undetachably fixed to the hull or the outer skin, respectively, of the boat, without being in the way when the boat is packed up. Consequently, this embodiment also eliminates the necessity of assembling the fiddles or antirolling rims and of pushing them into their holders when the boat is assembled or set up, which is thus further simplified.

The supporting structure 3 is supported on the upper side of the hull 2 by two inflatable beads 15 extending along the two lateral sides of the boat, by means of a pair of fore stays 13 and a pair of aft stays 14, as shown especially in FIGS. 3 and 4. The lower ends of the stays 13 and 14 are seated in sockets 16 which are preferably made of the same material as the hull 2 and undetachably fixed thereto, for example, by vulcanizing. The two fore stays 13 are detachably connected, through the intermediary of coupling members 17, with a multipart supporting frame 18 supporting the front part of the cabin roof 9 and additionally reinforced by cross bracings 19. The rear part of the cabin roof 9 is stretched by two longitudinally extending supporting rails 20 the aft end portions of which are bent with a relatively large radius through 90° and which, there, are connected to the aft stay 14 by means of coupling pieces 21. The other end portions of the two supporting rails 20 are pushed into the rear ends of the supporting frame 18 and thus connected with the front portion of the supporting structure.

The driving motor, not shown, is preferably secured in place by a mounting attachment 45 (FIG. 13), if not otherwise fixed to the hull 2. A cross rail 22 is carried by special supporting rings 23 associated with the two coupling pieces 21. Such a coupling piece 21 and its associated supporting ring 23 is shown on an enlarged scale in FIG. 5 in which is also illustrated a set screw 24 for fixing the cross rail 22. FIG. 6 is a side elevational view, partly in section, of the supporting frame and shows on an enlarged scale the subdivision of the frame into the various individual parts. In the represented embodiment, these latter are fitted into each other by means of socket connections 25 with the aid of a connecting pin 26 or secured in position by means of clamping connections 27 one of which is shown, for example, in the sectional view of FIG. 7. However, different constructions or similar similar fastening means may be used as well.

As is apparent from FIG. 6, the supporting rails 20 are composed of straight and bent members 28 and 29, respectively, which are connected by means of socket connections 25 as described. The two aft stays 14 are divided into an upper portion 30 and a lower portion 31 fitted into each other and secured in position so as to be adjustable by the clamping connections 27. Each clamping connection 27 is so constructed that in its releasing position it not only permits the complete separation of the two portions but for stretching the outer skin 1 it also enables the two end portions, such as 29 and 30, to be slightly pulled apart and then clamped in this position in which the skin 1 is tightly stretched.

FIG. 8 shows the rear part of the supporting structure as seen from within of the boat. FIG. 9 is a top plan view, partly in section, of the forward portion of the supporting structure forming the supporting frame 18, the individual parts of which are also connected by the described socket connections 25.

As shown in FIGS. 10 and 11, seats 32 are disposed transversely of the longitudinal axis of the boat and rest by their end portions directly on the two lateral inflatable beads 15 and/or on an inflatable stern bead 33. The end portions of the seats 32 are tightly enclosed on all sides by lateral pockets 34 arranged on the beads 15 and 33. These pockets 34 are preferably made of the same material as the hull 2 and undetachably connected with the latter by vulcanizing or gluing. As illustrated in FIG. 12, auxiliary paddles 35 are disposed in the same manner as the seats 32, i.e. transversely of the longitudinal central axis of the boat, and carrying a steering device 36 which is known per se and easily detachable from the paddles 35 by means of a quick-action locking device 37. The pockets 34 for the seats 32 and the auxiliary paddles 35 are, in the embodiment of the hull shown in FIG. 13, provided with zip fasteners 38 which enable the pockets 34 to be opened for lodging or removing the seats 32 or the auxiliary paddles 35, respectively.

In FIGS. 10 and 11 the rear portion of the cabin roof 9 is opened. Zip fasteners 39 are provided along the junction between the side walls 10 and the cabin roof 9 which are invisible when the cabin is closed since they are covered by overhanging edges of the roof 9. After having been opened the roof 9 is rolled up and kept in position by one or more straps 40. At the stage of assembly shown in FIGS. 10 to 15 also zip fasteners 41 (FIG. 10) are opened which extend downwardly from the roof 9. The side walls 10 are folded down inwardly over the supporting structure 3 and the upper edges of the side walls 10 previously connected with the roof 9 are secured to the hull 2 by means of the half of the zip fastener 39 already present on the upper edge of the side walls 10 and a zip fastener half 42 additionally arranged on the upper side of the inflatable beads 15. The side walls 10 thus secured are tightly stretched by the supporting structure 3, particularly the supporting rails 20 thereof, the two halves of the side walls 10 enclosing these rail portions on both sides. The mounting attachment 45 for the outboard motor is fitted on the cross rail 22 (FIG. 13) which may consist of two telescoped parts. This mounting attachment comprises a plate 45a which is adjustable by means of a guide strip 45b on each side thereof and can be adapted to the outboard motor by means of two wing nuts or other fastening means 45c (FIGS. 16 and 16a).

As shown in FIGS. 17 to 20, the supporting structure is assembled in a different manner at this stage of construction. The supporting rails 20 have been released by opening the coupling pieces 21 and removing the socket connections 25 from the supporting frame 18 and then have been pushed by their bent portions 29 into sockets 43 of the coupling members 17, where they are secured by clamp connections 27. The two other end portions of the supporting rails 20 are inserted with the aid of the socket connections 25 in the end portions of the cross rail 22 which is held by the lower portions 31 of the stays 14 and respective retaining members 44 (FIG. 19) inserted therein and fixed by means of the clamp connections 27. The two upper portions 30 of the stays 14 have been removed together with the coupling pieces 21 and the supporting rings 23.

FIG. 13 shows the ready-to-start hull 2, without its outer skin 1, as an upwardly open inflatable boat which is provided with the mounting attachment 45 for the outboard motor and the construction of which corresponds in all parts to the described cabin boat, with the exception of the supporting structure 3 and the outer skin 1. The arrangement of the seats 32 is particularly apparent from FIG. 13. Both the front and rear seats 32 have substantially the same surface area. The front seat is longitudinally divided into two settees with back rests by a likewise padded tilting partition 46, whereas only the forward half of the rear seat provides a sufficiently large seat surface. The rearward half of this seat is placed on the inflatable stern bead 33, thereby to ensure that between the passengers seated on the forward half of the stern seat and the tiller of the outboard motor there is sufficient free space so that the tiller can be freely moved. Moreover, this particularly large stern seat may also be used as a lounge deck for basking.

Figure 23:
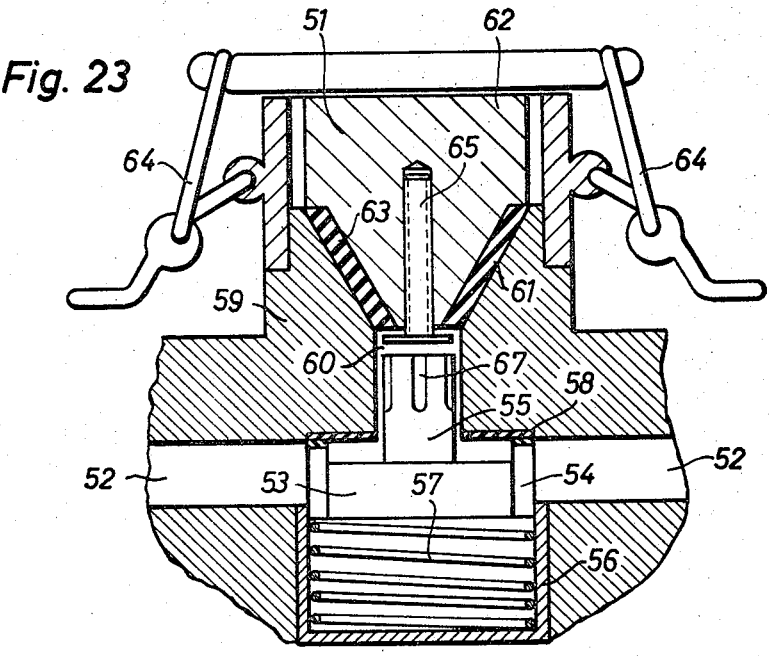
FIGS. 23 to 25 are longitudinal sections through the air chamber valve in the closed and opened condition and when inflating the air chambers.
Figure 24:
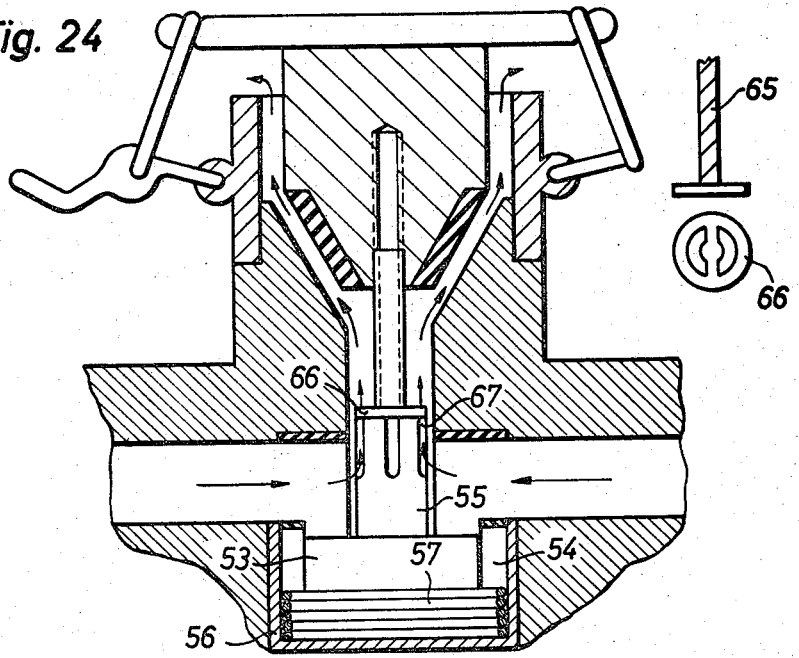

The supporting structure 3, which is not illustrated in FIG. 13, is used as a rail in this case. The forward part of the supporting structure 3 is completely removed and only the rearward part is left as shown in FIG. 20. The two bent end portions 29 of the supporting rails 20 are turned downwards and received by the sockets 16, since these are free now the fore stays 13 and the supporting frame 18 have been completely disassembled. In the illustrated embodiment, the inflatable beads 15 and 33 of the hull 2 consist, as shown in FIGS. 21 and 22, of four individual air chambers 47, 48, 49 and 50 which, while having a common external wall, are in no way interconnected. The bow 5 and the stern 6 of the hull 2 are in each case supported by two respective air chambers 47, 48 and 49, 50 which overlap on the greater part of their length. For inflating and evacuating the air chambers 47 to 50 two valves 51 are provided which permit two air chambers, for example air chambers 47 and 50, to be simultaneously inflated or evacuated, respectively. FIG. 23 shows such a valve in closed position. Two air channels 52 lead into the air chambers and are closer towards the outside and simultaneously separated from each other by a sealing member 53 consisting of two cylindrical portions 54 and 55 of which the lower one 54 sealing the air chambers has a considerably larger diameter than the integral upper guiding portion 55. The portion 54 of the sealing member 53 is axially displaceable in a box 56 which is preferably brought in by vulcanizing and urged against a sealing surface 58 by the action of a helical compression spring 57. The guiding portion 55 projects with considerable play on all sides into an axial bore 60 of a valve box 59. The bore 60 in the valve box 59, which is preferably made of rubber, is outwardly widened in funnel fashion, thereby forming a conical sealing surface 61. The counterpart is formed by a sealing cone 62 made of metal or plastic and having sealing surfaces which are preferably provided with a thick rubber coating 63. The sealing cone 62 is firmly urged into the valve box 59 by a toggle closure 64 and thus additionally seals the air chambers towards the outside. If the air chambers are to be evacuated, first of all the toggle closure 64 must be opened and the sealing cone 62 withdrawn from the valve box 59. A pressing pin 65 coaxially threaded into the sealing cone 62 and provided at its lower end with a perforated pressing plate 66 is unscrewed to such an extent that it is capable of moving the guiding portion 55 of the sealing member 53 downwardly against the action of the spring 57 when the sealing cone 62 is re-inserted, whereby the sealing portion 54 is disengaged from the sealing surface 58 and moved downwardly within the box 56 until the two air channels 52 of the air chambers are opened towards the outside. At the same time the spring 57 is pressed together to form a block limiting the travel of the sealing member 53. Since the pressing pin 65 has been unscrewed, it is impossible for the sealing surfaces 61 and 63 of the outer seal formed by the valve box 59 and the sealing cone 62 to come again into contact so that a relatively large cross-sectional area remains open for the evacuation of the air. The guide portion 55 of the sealing member 53 is additionally provided with longitudinal grooves 67 distributed around its circumference, which provide a relatively large clear cross-sectional area for the air escaping from the two air chambers through the air channels 52, the bores 60 and the opened outer seal 61, 62, 63, as shown by arrows in FIG. 24.

Figure 25:
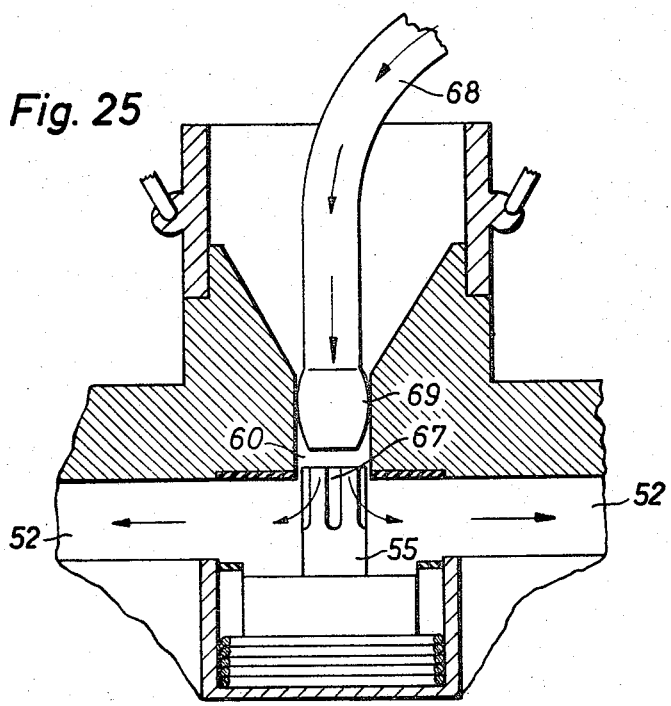

As illustrated in FIG. 25, the same valve 51 is also used for inflating the air chambers. The sealing cone 62 having been removed, a pair of bellows or a compressed-air bottle (not shown), respectively, is connected to the valve 51 through a flexible supply tube 68. To this end a sealing element 69 arranged at the end of the supply tube 68 is pushed in a fluid-tight manner into the bore 60. The compressed air will pass through the longitudinal grooves 67 of the guide portion 55 and through the air channels 52 into the air chambers.

Figure 26:
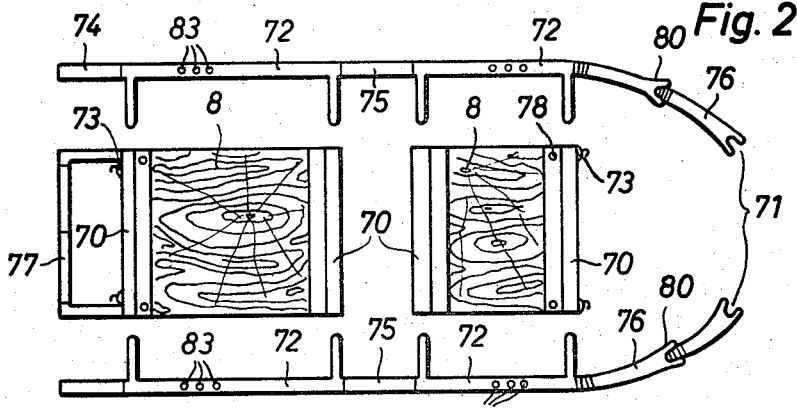
FIG. 26 is a top plan view of the bracing structure.
Figure 27:
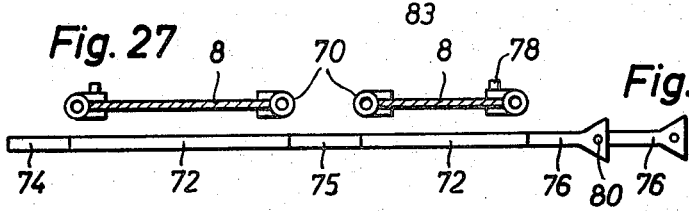
FIGS. 27 and 28 show the planks and one of the longitudinal braces.
Figure 28:
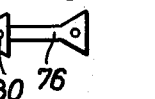

FIGS. 26 to 28 show the bracing structure 7 with the planks 8 of the hull 2. In the illustrated embodiment the bracing structure 7 is composed of a plurality of components which are assembled by means of plug-and-socket connections to form two symmetrically identical composite structural parts 71. Between the parts 71 there are arranged the floor planks 8 the fore and rear edges of which, with respect to the direction of travel, are framed with particularly shaped strips 70 preferably consisting of metal or plastic. U-shaped structural parts 72 can be pushed into the strips 70 from the side and clamped by means of clamping locks 73. The bracing structure 7 is completed by intermediate members 75 as well as stern and bow members 74 and 76, respectively, which are connected with the U-shaped structural parts 72. The rear one of the two floor planks 8, moreover, is provided with a multiparts end frame 77 on its side facing the stern, whereby the floor planks 8 and the bracing structure 7 are fixed also in the longitudinal direction of the boat.

FIGS. 29 to 31 show a luggage carrier which is adapted to be mounted on the roof of a transport vehicle and assembled from several components of the supporting structure 3, the bracing structure 7 and the floor planks 8 of the cabin boat. The two floor planks shown in FIG. 26 are pushed together by their adjacent edges and bolted to each other in a manner not shown. The U-shaped parts 72 of the bracing structure are pushed into the sectional strips 70 of the bottom planks from the side, in the same way as during the assembly of the boat. The sectional strips 70 are provided with internal threads 78 for receiving holding screws 79 carrying a frame which serves as a rail and is arranged above the floor planks 8 at a relatively great distance apart therefrom. The upper frame, in this case, consists exclusively of components of the supporting structure 3, viz. of the supporting rails 20 on the longitudinal sides, the cross bracing 19 on the front and of the cross rail 22 on the rear. The luggage carrier can be adjusted to vehicle roofs of any width by loosening the clamping locks 73 and subsequently pulling out or pushing in the U-shape parts 72. The four bow members 76 of the bracing structure 7 serve as supporting and fixing members for the roof-mounted luggage carrier. After having been detached from each other at their joints 80 (FIGS. 26 and 28) the four bow members 76 can be fixed, on the one hand, to the U-shaped parts 72 of the luggage carrier and, on the other hand, to the roof edge of the transport vehicle.

By providing a plurality of threaded holes 83 it is possible to displace the bow members 76, which are usable as supporting and fixing members, in such a manner that the luggage carrier can also be adapted to vehicle roofs of any length, by threading the bow members 76 into the appropriate threaded holes 83.

As shown in FIG. 32, the luggage carrier can be converted by a few manipulations into a boat's cart capable of holding the collapsed boat, by mounting four preferably tyred wheels 81. To effect this the U-shaped parts 72 must be laterally pulled out of the strips 70 of the floor planks 8 after the clamping locks 73 have been unlocked, and then the wheels 81, preferably together with their bearings, have to be pushed on to the shanks of the U-shaped structural parts 72 that are associated with the corners of the luggage carrier. The structural parts 72 are subsequently reassembled in the same way and the clamping locks 73 of the floor planks 8 are firmly clamped.

According to a further feature of the invention, the cabin boat of the embodiment illustrated in FIG. 33 consists of the outer skin 1 made in one piece, the supporting structure 3 and a bracing structure 7a replacing the inflatable hull 2 and tightly stretching the outer skin 1. For the rest, the outer skin 1 and the supporting structure 3 are of the same design and dimensions as in the cabin boat of the first embodiment.

FIG. 33 further shows two of four profiled bracing strips of which a lower bracing strip 84 is disposed below the water line along the joint between the boat's floor and the side wall, whereas an upper profiled bracing strip 85 is arranged on the side wall at the level of the seats. The bracing strips 84 and 85 running from the bow to the stern can be disassembled into handy components which are connected in a manner not shown. The profiled bracing strips 84 and 85 are held by the other parts of the bracing structure 7a and braced against the outer skin 1.

As will be noted from FIG. 34 the bracing structure 7a consists, in addition to the profiled bracing strips 84 and 85, of three frames which are interconnected by means of four longitudinal braces 86 and 87. The longitudinal braces 86 arranged on each side of the boat are of the same construction as in the cabin boat of the first embodiment.

The two upper longitudinal braces 87 carry padded transverse seats 32 disposed respectively at the stern and substantially midships and, in addition, also transversely disposed auxiliary paddles 35 in the forward portion of the boat. Where the seats and the auxiliary paddles 35 are placed on the upper longitudinal braces 87, the latter are provided with offset portions corresponding to the widths and thicknesses of the seats 32 and auxiliary paddles 35 so that the upper edges of the longitudinal braces 87 are flush with the upper edges of the seats 32 and the auxiliary paddles 35.

The interior of the cabin boat is particularly apparent from FIG. 35 which also shows the disposition of the seats 32 and of the auxiliary paddles 35 to which in the same way as in the cabin boat having the inflatable boat insert a generally know steering device 36 is secured so as to be easily detachable. Moreover, padded tilting partition 46 divides the forward seat 32 into two separate settees, the partition 46 providing a comfortable back rest for both settees.

The frames that are interconnected by the longitudinal braces 86 and 87 are composed, as shown in FIG. 36, of two substantially upright lateral supports 89 which can be steplessly telescoped to a limited extent and can also be secured in any adjusted position by means of clamping connections 27. The upper cross pieces of the frames are formed by the seats 32 the end portions of which slightly project beyond the lateral supports 89, whereas the lower cross pieces of the frames consist of floor planks 8a which serve at the same time as step boards. The floor planks 8a are constructed in the same manner as in the cabin boat with the inflatable boat insert and are brought to a width corresponding to the enlarged internal space of the boat according to the invention by merely attaching detachably mounted complementary parts 8b.

The upper cross piece of the fore frame is formed by the auxiliary paddles 35, which in relation to the other parts of the frame are longitudinally staggered to a small extent and clamped to the upper longitudinal braces 87 by overlapping clamp means schematically indicated at 91 in FIG. 34. The profiled bracing strips 84 and 85 are supported in the region of the frames through the intermediary of braces 92 which are in each case combined with a lateral support half 89a or 89b, respectively, to form an integral supporting element 89. Such a supporting element 89 is illustrated in FIG. 38 as having a profiled bracing strip 84 attached thereto. A bore 93 enables the supporting elements 89 to be pushed on to the longitudinal braces 86 and 87. The supporting elements 89 are, moreover, provided with means, not shown, for their fastening on the longitudinal braces 86 and 87.

The lower ends of the supporting structure 3 engage, in the illustrated embodiment, in bores or recesses 94 in the seats 32 which are closed on the underside of the seats 32 by a plate 95 of sufficient thickness. Immediately above the seats 32 or the upper profiled bracing strips 85 there is arranged a span wall 96 on each side wall inside the outer skin 1, which span walls extend continuously from the bow to the stern and enclose the laterally arranged parts of the bracing structure 7a covering them towards the interior of the boat. The span walls 96 are of the same material as the outer skin 1 and fixed with their longitudinal edges turned away from the outer skin to the lower longitudinal braces 86 or the floor planks 8a, 8b, respectively, by means of connecting elements 97. At the level of the upper edge of the seats 32 a zip fastener half 103 is arranged on each span wall 96 in the stern of the boat, by means of which the upper inwardly folded part 98 of the outer skin 1 can be fastened to the lower part of the cabin boat when the cabin is opened.

The end frame used in the cabin boat including the inflatable boat insert, which when assembled in inverse order provides a supporting stern structure 77, as shown especially in FIG. 39, serves to brace and stretch the stern of the boat, as well as a length compensation after elimination of the inflatable hull.

As shown in FIG. 36, an inflatable double-floor 100 is arranged between the boat's floor formed by the outer skin 1 and the floor planks 8a, 8b. The double-floor 100 comprises four indented air chambers 101 hermetically sealed off from one another by partitions 122. The air chambers shown in FIG. 37 can be inflated or evacuated by a common valve 51a. The valve 51a is of substantially the same design as the air chamber valve of the cabin boat with the inserted inflatable boat but provided with four air channels, i.e. an air connection piece for each air chamber, instead of only two air channels.

FIG. 40 shows the supporting and bracing structures 3 and 7a, respectively, assembled to be used as a tent. To this end the upper profiled bracing strips 85 with their braces, and the upper longitudinal braces 87 as well as the seats 32 have been removed. The supporting structure 3 is held by the upper half 89b of the lateral supporting elements 89 being inserted in the supporting structure and secured in position by means of a locking pin or the like, not shown. The inflatable double-floor 100 bears on the floor planks 8a, 8b and serves as a soft cushion as well as an insulation against cold and moisture.

As shown particularly in FIG. 37, the intermediate air chambers 101 of relatively large surface area are provided with means 102 preventing the double-floor 100 from swelling like a balloon upwardly and downwardly when being inflated.

To render the bow of the cabin boat resilient, the profiled bracing strips 84 and 85 are provided with guides 99 (FIGS. 33 and 39) housing appropriately rated helical compression springs 104 and preferably resilient plastic braces 105 which are resiliently urged forward by the springs 104 and in the event of a collision will be resiliently telescoped into the guides 99. The braces 105 are connected by a profiled member 106 pushed onto their forward ends. Appropriately rated helical compression springs 104 are also accommodated in the lower halves 89a of the supporting elements 89 to urge the upper members 89a thereof resiliently upwards, thereby to provide for resilient absorption of pressures transmitted from the cabin roof or from the bottom of the boat.

It will be further noted from FIG. 39 that both the starboard and the larboard sides of the boat are resiliently stretched. This is obtained in that the stips 70 are also provided with, preferably, helical springs resiliently holding the longitudinal braces 86 and 87 and their profiled bracing strips 84 and 85.

Figure 49:
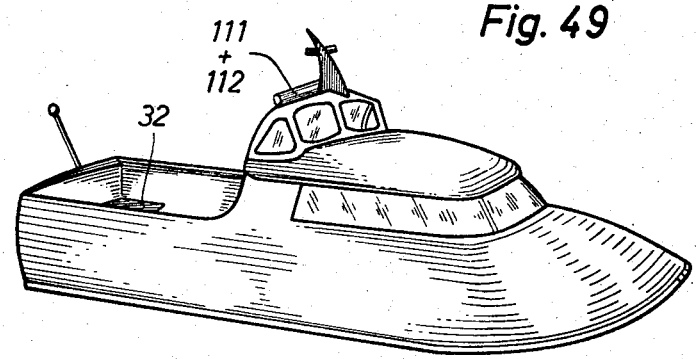
FIG. 49 is a side view of the cabin cruiser with the cabin in opened condition.
Figure 50:
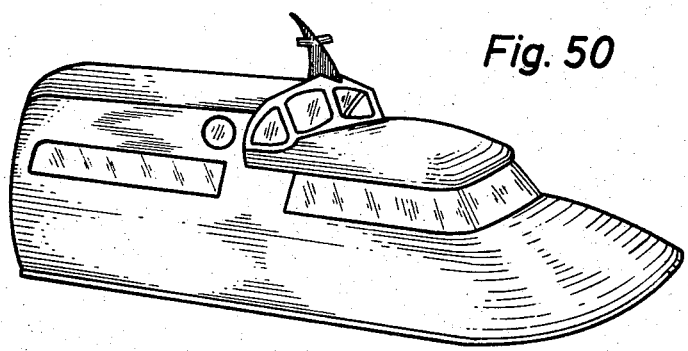
FIG. 50 is a side view of the cabin cruiser with the cabin in closed condition.

For converting the cabin boat into a cabin cruiser (FIGS. 49 and 50) first the seats 32 must be removed and then the steering gear 36 has to be detached from the paddles 35 and mounted in another place, for example as indicated at 117 in FIG. 45. Subsequently also the cross rails 22 with their supporting rings 23 and retaining members 44 may be removed.

FIG. 41 shows that after the stern seat 32 has been removed the struts 31 are fixed to the upper longitudinal braces 87 so that the stern clamping structure 22a, which in this embodiment is made in one piece, can be pulled on the struts 31 together with its outer skin 1 in that the stern clamping structure is accommodated in a loop of the outer skin 1 and tightened and lashed at the stern clamping devices 22b. Such a stern clamping structure 22a with stern clamping devices 22b is shown in FIG. 42. Finally, arm clamping devices 107 are attached (FIG. 43). Later on the supporting rails 20 will be inserted in these arm clamping devices 107. FIG. 41 shows the cabin cruiser with open cabin. As in the cabin boat, also in this case the outer skin 1 is pulled over the supporting rails 20 and fixed to the span wall 96 by means of the zip fastener half 103.

In order to attain the corresponding height to the guides 109a for the inverted supporting rails 20 sockets 110 are inserted in the struts 31 and pulled out again to such an extent and fixed in this position as results necessary for the connecting or supporting rails 20. The lower openings 18a in the multipart supporting frames 18 are, as is known, intended for the cabin boat with closed cabin (FIG. 41). These are used in this embodiment for fixing the helm as at 117 in FIG. 45.

It has also to be noted that in the cabin cruiser the seats 32 are arranged as stuffed chaise-longues in the cabin which has become free. Collapsible seats or a collapsible wooden bench 122 may be disposed in the stern of the boat (FIG. 46). It is further pointed out that in this embodiment the quarter deck remains rolled up but is now fixed at 123 to the lower cross bracing 19 instead of to the foredeck, without it being necessary to sever the hood. This change has become necessary to provide free sight for the person at the helm.

FIG. 47 shows the quarter deck 112 and the side walls 111. The lower side walls 111 are undetachably connected with the quarter deck. The lower side walls 111 and windows 109 are preferably provided with zip fasteners 113 which are fastened to the second existing side wall of the boat. Moreover, the quarter deck 112 and the side walls 111 are also preferably connected to the windows 109 by means of zip fasteners. By this measure the difference resulting from the added storey is compensated. The zip fasteners are not visible on the outside of the cabin cruiser since they are covered also in this case by an overhanging hood (FIG. 47).

FIG. 45 shows an elevated seat 116 provided for the person at the helm and adjustable and fixable in sockets 114. The seat 116 has a covered back rest to provide better hold in a rough sea and is provided with a foot rest 115 which is also adjustable and fixable as desired.

The mounting attachment 117a for the outboard motor 118 is so constructed that the lower end portions thereof project into vulcanized on pockets 119 (FIG. 46). The supporting attachment 117a is preferably provided with clamping connections 121 having the function of retaining and adjusting to any desired height a mounting plate 120 for one or two outboard motors (FIG. 48).

FIG. 44 shows the floor planks of the cabin cruiser. In this embodiment, the floor planks of the cabin boat are arranged adjacent one another. As a complementary part, a floor plank member 8c is attached.

In this form of construction the bow members 76 are eliminated and replaced by structural parts 124 attached to the structural parts 72 so that the cabin cruiser is given a firm continuous floor.

I claim:

1. A collapsible cabin boat, comprising inflatable hull means defining, in the inflated condition thereof, the outline of a hull having an upper side, bow and stem; bracing means comprising substantially rigid members operatively associated with said inflatable means for bracing and reinforcing the same in inflated conditions; one piece watertight flexible skin means of pliable sheet material constituting an envelope and comprising a first shaped portion which tightly encases said inflatable hull means and said bracing means, and a second shaped portion integral with said first portion and erectable on said upper side in form of a superstructure in response to requisite internal support; and support means comprising substantially rigid members carried by said bracing means and hull means arranged internally of said second shaped portion and supporting the same in erected condition in the shape of a superstructure.

2. A boat as defined in claim 1, wherein said hull means consists of synthetic plastic material and comprises a plurality of inflatable air chambers.

3. A boat as defined in claim 1, wherein said bracing means and said support means each comprise a plurality of connecting members and of coupling members operative for releasably coupling the respective connecting members.

4. A boat as defined in claim 3, wherein said superstructure is a boat cabin having side walls and a roof, said skin means being constructed and arranged so that sections of said second portion which form a rear part of the cabin roof and the upper rear parts of the cabin side walls may be rolled and folded inwardly so that the space enclosed by the cabin is decreased and the cabin converted to a different configuration.

5. A boat as defined in claim 4, wherein said support means is constructed and arranged for assembly in such a manner as to support the superstructure in any converted condition thereof.

6. A boat as defined in claim 4, wherein said sections of said second portion are separable from one another in the region of the rear portion of the cabin along the juncture of side walls and roof.

7. A boat as defined in claim 6, and further comprising concealed watertight zippers provided on the respective sections for releasably securing the same to one another, the sections constituting the side walls of the cabin being securable to said upper side of the hull in the conother, the sections constituting the side walls of the cabin 8. A boat as defined in claim 1, wherein said inflatable hull means comprises at least four separate elongated air chambers overlapping one another over the major part of their length, particularly at the bow and stern of the hull.

9. A boat as defined in claim 8, wherein said support means form a supporting structure comprised of a plurality of supports, and wherein each support is carried by at least two of said air chambers.

10. A boat as defined in claim 1, wherein said inflatable hull means comprises at least a pair of separate elongated air chambers; and further comprising a single valve operatively associated with said air chambers for inflating and deflating the same, said valve being operative for movement between an open position in which said air chambers communicate and are inflatable, and a closed position in which the inflated air chambers are out of communication with one another.

11. A boat as defined in claim 10, wherein said valve comprises an outer sealing case, a toggle closure bracing said outer sealing case, and an automatically operating spring-loaded inner sealing member arranged in said case and constituting a dual seal for the respective two air chambers.

12. A boat as defined in claim 8; and further comprising stiffening means for said hull in the form of auxiliary paddles and seats operatively associated with said hull and extending transversely of the elongation of the same.

13. A boat as defined in claim 12, wherein said hull is provided at the upper side thereof with transversely spaced lateral pockets provided with closure means, said paddles and said seats having portions tightly but releasably received in the respective pockets.

14. A boat as defined in claim 13; and further comprising a steering device, and a quick-action coupling device operative for releasably coupling said steering device to said auxiliary paddles.

15. A boat as defined in claim 1, said inflatable hull means being watertight so as to constitute a seaworthy open-top pneumatic boat in the absence of said skin means.

16. A boat as defined in claim 3; and further comprising deck planks constituting a deck at said upper side of said hull means, and seats carried by said hull means; said bracing means and support means being constructed and arranged for assembly in conjunction with said deck planks and seats at the will of a user into a luggage carrier adapted to be mounted on the roof of a motor vehicle and capable of carrying the remainder of the boat in collapsed condition, or with the addition of wheels into a cart adapted to carry the remainder of the boat in collapsed condition, said deck planks and said seats constituting the bottom walls and side walls of the carrier and cart, respectively.

17. A boat as defined in claim 1; further comprising anti-rolling rims extending along said skin means externally of said boat in the longitudinal direction of the latter and below the water-line, at least one of said anti-rolling rims having a longitudinal passage therein; and an anchor rope accommodated in said passage and extending from the bow to the stern of said boat.

18. A boat as defined in claim 1, wherein said hull means and said skin means are integral with one another.

19. A boat as defined in claim 3, wherein said connecting members and coupling members of said bracing means and said supporting means consist of light-weight metal.

20. A collapsible cabin boat as claimed in claim 1, wherein the bracing menas comprises a plurality of spaced frames distributed over the length of the boat and arranged transversely to the direction of motion of the boat, which frames are rigidly interconnected by continuous longitudinal braces extending in the direction of motion of the boat, each frame having upper cross members formed by seats which rest with their end sections on the longitudinal braces arranged on both sides, and lower cross members formed by floor planks serving as a tread, substantially upright supporting elements being associated with each frame which are variable in length and arrestable.

21. A collapsible cabin boat as claimed in claim 1, wherein the bracing means is braced with the skin means by at least four bracing strips extending continuously in the direction of motion of the boat from the bow to the stern and at least one of the bracing strips is provided on each side of the boat below the water level along the transition edge between the bottom of the boat and a side wall and at least one of the bracing strips is arranged on the side wall at the level of seats, the surfaces of the bracing strips facing the skin means having a curvature corresponding to the outer shape of the boat.

22. A collapsible cabin boat as claimed in claim 21, wherein the bracing strips are connected in the region of frames through at least one brace to the remaining parts of the bracing means and braces of the bracing strips are constructed, together with one half of the frames' supporting elements as a one-part supporting element and the supporting elements can be pushed onto longitudinal braces of the bracing means and are provided with means for fixing the supporting elements to the longitudinal braces.

23. A collapsible cabin boat as claimed in claim 1, wherein an inflatable double-bottom serving as an air cushion is detachably arranged between floor planks and the skin means, said double-bottom being subdivided into four separate indented air chambers.

24. A collapsible cabin boat as claimed in claim 23, wherein all air chambers are inflatable and deflatable through a single air chamber valve and the individual air chambers do not communicate with one another in a compressed air conducting manner in the closed condition of the valve.

25. A collapsible cabin boat as claimed in claim 21, wherein a span wall extending continuously from the bow to the stern is secured to the inner side of the skin means on both sides of the boat directly above the bracing strips arranged at the level of the seats, said span walls manufactured from the same material as the skin means, said span walls enclosing both supporting elements of frames and the bracing strips and covering them toward the interior of the boat, the longitudinal edges of the span walls remote from the skin means are secured to lower longitudinal braces and floor planks with the aid of connecting elements, and wherein, with the cabin partly collapsed, inwardly folded side walls are secured to the top sides of the span walls.

26. A collapsible cabin boat as claimed in claim 1, wherein floor planks, by attaching a detachably secured complementary part, are brought to a width corresponding to the interior of the boat.

27. A collapsible cabin boat as claimed in claim 25, wherein the cabin boat is convertible into a tent by removal of the seats, upper longitudinal braces and upper bracing strips as well as by supporting a supporting structure with the aid of the supporting elements.

28. A collapsible cabin boat as claimed in claim 1, wherein said skin means comprise a one-part watertight outer skin of elasitc material forming the body of the boat, an upper deck, side walls and a cabin roof; said skin rigidly held in the upper and lower regions of the boat in stretched condition by a multiple-part bracing structure, wherein the cabin boat is held under elastic tension by the supplementation with appropriately strong helical springs in strips, guides and supporting elements and in addition to the helical springs the guides may accommodate resilient braces made of synthetic plastics material and held together by a profiled member.

29. A collapsible cabin boat as claimed in claim 1, wherein the cabin boat is convertible into a cabin cruiser by removal of seats, paddles, steering device, bow members, cross rails, supporting rings and retaining members and supplementation with a stern clamping structure, arm clamping devices, a quarter deck with side walls, windows, a driver's seat, a floor plank member and structural parts, wherein the quarter deck with its side walls and windows has the property of raising the cabin cruiser, a raised covered and adjustable driver's seat and an adjustable foot rest is provided and with the cabin opened the cabin cruiser has a high side wall.

30. A collapsible cabin boat as claimed in claim 29, wherein the separating points of the side walls of the quarter deck have watertight fasteners, adapted to be connected to existing zip fastener halves of the side walls formed by the skin means, and wherein, with the cabin partly collapsed and the side walls folded inwardly, the quarter deck with its side walls is placed in rolled-in condition on the windows.

31. A boat as defined in claim 1; and further comprising mounting plate means constructed and arranged for mounting at least one outboard motor exteriorly of said cabin boat and with freedom of positioning at a plurality of different heights.

32. A collapsible cabin boat as claimed in claim 29, wherein the stern clamping structure comprises sockets and struts, wherein the sockets in the struts are withdrawable to such an extent that the difference of raising supporting rails to their guides is established.

33. A collapsible cabin boat as claimed in claim 29, wherein the stern clamping structure has stern clamping devices on struts, said stern clamping devices having their own clamping properties independently of the arm clamping devices and each of the arm clamping devices has its own clamping properties independently of the stern clamping structure.

34. A collapsible cabin boat as claimed in claim 29, wherein existing floor planks are assembled and another floor plank member is attached supplementary to the existing floor planks so that the cabin cruiser has a continuous stable bottom surface.

35. A boat as defined in claim 31, said mounting plate means being constructed and arranged for mounting at least one additional outboard motor exteriorly of said cabin boat and with freedom of positioning at a plurality of different heights.

36. A collapsible cabin boat, comprising one piece water-tight flexible skin means consisting of flexible sheet material and constituting an envelope comprising a first shaped portion and a second shaped portion integral with said first shaped portion; inflatable hull means located within said one piece watertight flexible skin means and defining, in the inflated condition thereof, the outline of a hull having an upper side and being adapted to tightly expand said first shaped portion so as to be encased therewithin; and support means carried by said inflatable hull means arranged internally of said second shaped portion and supporting the same at said upper side of said inflatable hull means in erected condition in the shape of a super-structure.

37. A boat as defined in claim 36, wherein said hull means consists of synthetic plastic material and comprises a plurality of inflatable inner chambers.

38. A boat as defined in claim 37, wherein said inflatable hull means is water-tight and is adapted to constitute a seaworthy open-top boat in the absence of said skin means and said support means.

References Cited

UNITED STATES PATENTS

| | | | |
|---|---|---|---|
| 2,298,714 | 10/1942 | Moats | 9—2 |
| 2,451,855 | 10/1948 | Mercier et al. | 9—2 |
| 3,056,979 | 10/1962 | Holladay | 9—11 |
| 3,105,248 | 10/1963 | Ferrell | 9—2 |
| 3,092,854 | 6/1963 | Manhart | 9—11 |
| 3,130,406 | 4/1964 | Jones-Hinton et al. | 9—11 X |
| 3,131,406 | 5/1964 | Cousteau et al. | 9—11 |

FOREIGN PATENTS

| | | |
|---|---|---|
| 124,578 | 3/1919 | Great Britain. |
| 673,417 | 6/1952 | Great Britain. |

MILTON BUCHLER, *Primary Examiner.*

R. A. DORNON, *Assistant Examiner.*

U.S. Cl. X.R.

9—6; 114—126; 115—17; 141—348; 224—420.1